Jan. 31, 1967 D. H. PALFREYMAN 3,301,609

OILLESS ANTIFRICTION DEVICE

Filed Dec. 23, 1963 5 Sheets-Sheet 1

INVENTOR.
Donald H. Palfreyman
BY
Roberts, Cushman & Grover
ATT'YS

Jan. 31, 1967 D. H. PALFREYMAN 3,301,609

OILLESS ANTIFRICTION DEVICE

Filed Dec. 23, 1963 5 Sheets-Sheet 3

United States Patent Office 3,301,609
Patented Jan. 31, 1967

3,301,609

OILLESS ANTIFRICTION DEVICE

Donald H. Palfreyman, Walpole, Mass., assignor to Fabreeka Products Company, Boston, Mass., a corporation of Massachusetts Filed Dec. 23, 1963, Ser. No. 332,564
1 Claim. (Cl. 308—3)

This application is a continuation-in-part of application Serial No. 166,887, now abandoned.

This invention pertains to oilless antifriction devices for use in reducing sliding friction between a supporting and supported part where the working unit pressure involved is of a magnitude which would rarely be as great as 1500 p.s.i. and/or where the amplitude and frequency of relative motion of the parts is small such, for example, as may result from temperature change in the supported part, and for particular instance, but without limitation, relates to antifriction pads for use between a fixed bridge abutment or pier and that end of a bridge span which must be free to move in response to temperature variations, or, for further instance, for use between a structural beam or girder, either of metal or concrete, and the post, column or wall upon which one end of said beam or girder is supported.

As pointed out in the copending application for Letters Patent Serial No. 166,887, filed by Donald H. Palfreyman, on January 17, 1962, entitled "Oilless Anti-Friction Device," it has been customary to support the movable end of a bridge span for such movement by the employment of mechanical means, for instance a rocker arm or metal rollers, but such devices, in view of the loads which they must carry and exposure to weather and vibrations to which they are subjected in use, must necessarily be of expensive construction and are subject to deterioration from rust or corrosion. In the attempt to solve this problem, it has been proposed to interpose a stationary pad (for example, of the order of one inch in thickness), of neoprene or material having similar physical characteristics and of from 60 to 70 durometer hardness, between the pier and span in the expectation that, without appreciable motion of the opposite faces of the pad, relatively to the pier and span respectively, the material of the pad itself, at opposite sides of its horizontal median plane, would move oppositely, relatively, as permitted by the flexibility of the material of the pad, to a sufficient extent to compensate for temperature variations in the length of the span. However, materials heretofore employed in the manufacture of such pads appear unable to withstand, for long periods of time, the horizontal shearing stresses to which they are thus subjected, so that after a limited term of service such pads tear or otherwise fail. For this reason, in some of the States, at least, the authorities no longer permit the use of such pads unless they be enforced with plies of perforated metal, wire mesh, or the like. This substantially increases the cost of the pad and does not wholly overcome the deficiencies of the pads which are not so reinforced.

The present invention solves the above problems by substituting a very simple, inexpensive and long-lasting device for the former complicated and expensive mechanical devices and overcomes the deficiencies of the flexible neoprene pads, whether or not reinforced, and consists in providing two independent pads, one resting upon the pier or other stationary support and immovable relatively thereto, and the other contacting an undersurface of a part of the bridge span and being immovable relatively to the latter, said pads being relatively movable, bodily, and having contacting faces of a hard material having a low coefficient of friction such that, without requiring lubrication, the two pads may slide relatively to each other without scoring or seizing as the bridge span contracts and expands. Desirably, although not necessarily, each of these associated pads comprises a body portion of a material capable of absorbing shocks and of deadening vibration. The contacting faces of the associated pads, in accordance with one embodiment, are constituted by a fabric base impregnated with a cured thermosetting resin having the desired hardness, wear-resistance and low coefficient of friction. Not only does this arrangement provide the low friction, oilless, sliding contact between the parts engaging the pier and the span respectively, but it likewise provides means whereby the vibration of the span, resultant from passing loads, is very much dampened before being transmitted to the pier.

Thus, briefly, the primary object of the invention is to provide non-mechanical means of simple, inexpensive, durable and effective type for interposition between a bridge pier and the bridge span (or between other parts having relative sliding motion), such as to permit free relative motion of said parts, for example, in response to expansion and contraction of said parts, occasioned by temperature changes, with little frictional resistance and also to provide means for dampening vibrations transmitted from the span to the pier.

According to one embodiment of the invention, the device employs, as the antifriction material, a textile fabric, for example thin cotton canvas impregnated with a phenolic resin and has a very high compressive strength and low coefficient of friction and satisfactorily meets the reqiurements of most conditions of use. However, in accordance with another and preferred embodiment, the invention provides an antifriction device wherein the antifriction material employed has an even lower coefficient of friction than phenolic resin and is capable of functioning, satisfactorily, without appreciable deterioration under the most rigorous conditions of use.

Other and further objects and advantages of the invention will be pointed out in the following more detailed description and by reference to the accompanying drawings wherein.

Figure 18:
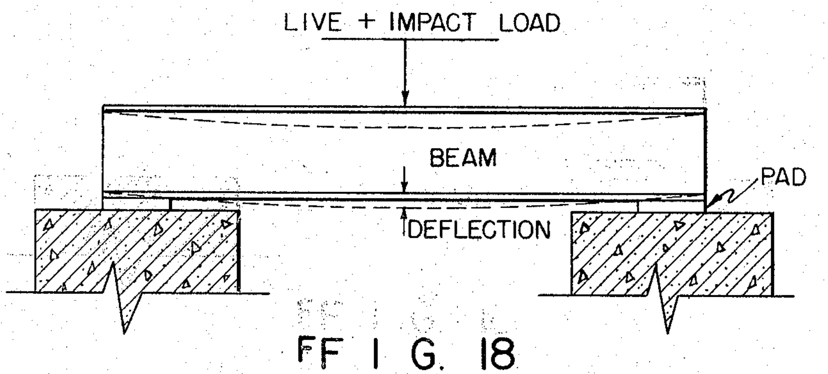
Figure 19:
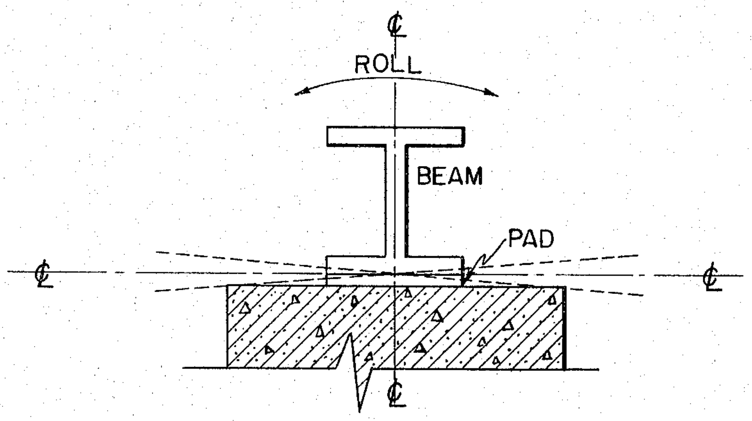
Figure 20:
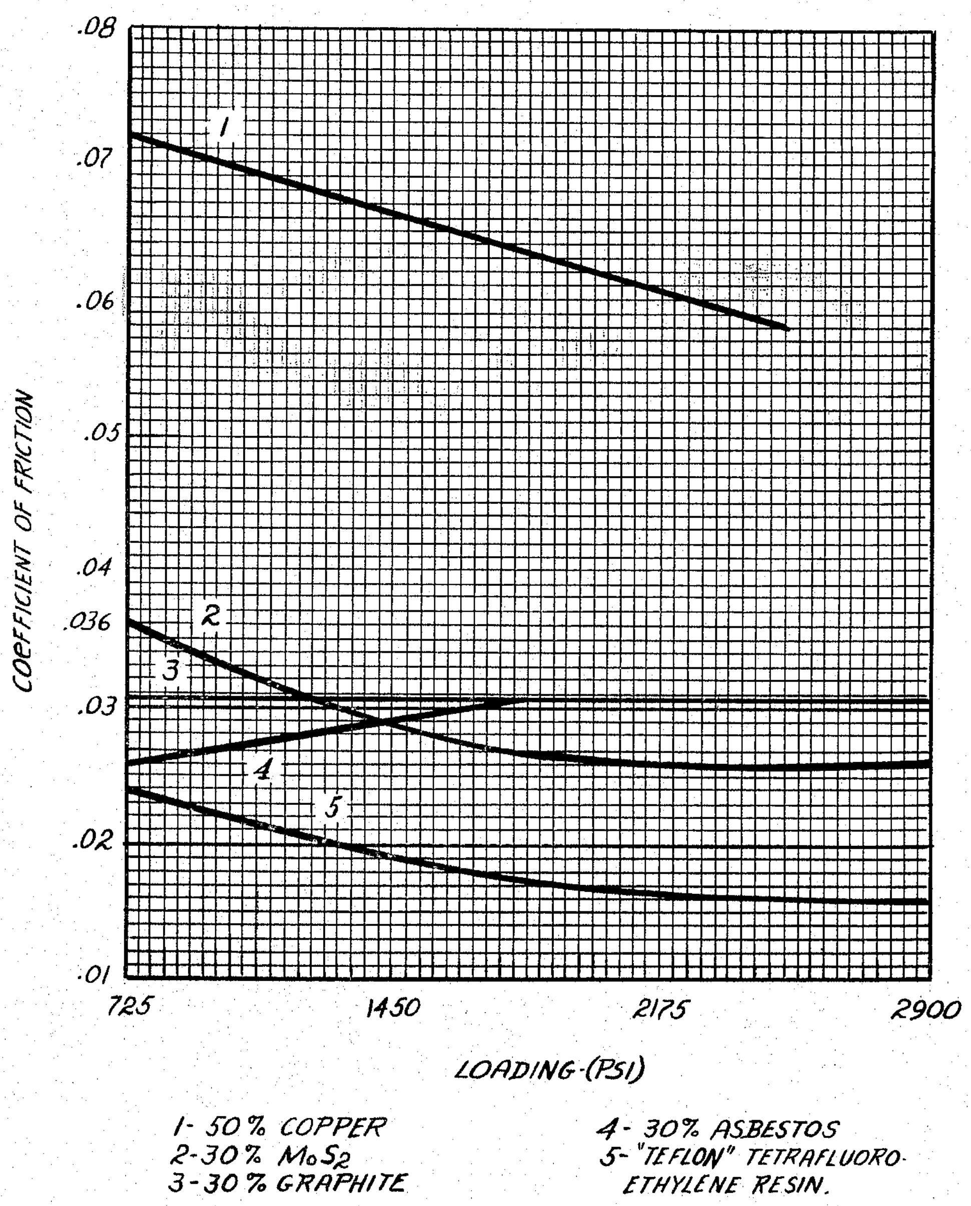

FIGS. 14 to 19 inclusive, are diagrams relating to methods of calculating pad thickness; and FIG. 20 is a graph illustrative of the coefficient of friction of Teflon, and compounds thereof under varying load.

Referring to FIGS. 1 to 7 of the drawings, the numeral 10 designates an antifriction device, according to one embodiment of the present invention—this device comprising an upper pad 11 and a lower pad 12. These pads would usually be of generally rectangular shape in plan view and of the same superficial dimensions—the size of the pad being dependent upon the particular use to which the device is to be put. For example, in bridge practice, the unit load on the pier, resultant from the weight of the span, may be of the order of from 800 to 1000 p.s.i., and the pad would be of such dimensions as normally to be subjected to a unit load of that magnitude.

Each of the pads 11 and 12 comprises a body portion F (FIG. 7) desirably of some degree of flexibility so that it may readily conform itself to slight irregularities of the surface of that one of the rigid, relatively movable parts (load and support, respectively) which it is intended to contact and, desirably, that surface of each pad which is to contact the rigid member with which it is to be associated, should be of a character such as to resist relative motion between it and said part, for instance, said contact surface may be inherently adhesive, or have a high coefficient of sliding friction. Thus, for example, the body of the pad might be of rubber compound, neoprene, fabric frictioned with rubber, or the like, although, in order that the device of the invention may serve not only as an antifriction device but also as a vibration deadening means, the body of the pad may be of a construction generally like the lamellar material more fully described in the patent to Brennan, 2,009,059, dated July 23, 1935. Briefly stated, the patented device comprises a plurality of plies or layers of very thin cotton duck (for instance, plies of the order of 1/72 inch in thicknes), cemented together and having a very thin layer (for instance, 0.008 inch thick), of soft rubber compound interposed, at intervals, between two layers of the fabric, the rubber layer or layers being so thin as substantially to eliminate any resiliency of the lamellar material normal to its layer thickness under variable compressive stresses applied in the direction of the depth or thickness of the layers, thus reducing lateral vibrations—although the rubber acts to lessen any tendency for the fabric to become compressed and lifeless.

Figure 1:
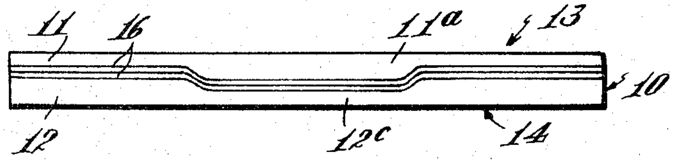
FIG. 1 is a diagramatic end elevation of an antifriction device, according to the present invention, illustrative of one embodiment thereof.
Figure 6:
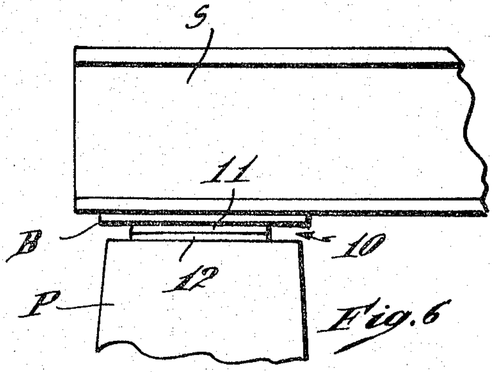
FIG. 6 is a fragmentary elevation diagrammatically showing the upper part of a bridge pier and that end of a bridge span which is free to move, with an antifriction device, according to the present invention, interposed between the pier and the span.

Referring to FIG. 6, wherein the antifriction device 10 of FIG. 1 is shown as installed in position of use, as a bridge pad, the lower member 12 of the device is shown as resting upon the upper horizontal surface of a brdge pier P, while the upper surface of the upper pad 11 of the antifriction device is shown as contacting the horizontal undersurface of a bearing plate B forming an element of the movable end of the bridge span S.

Figure 7:
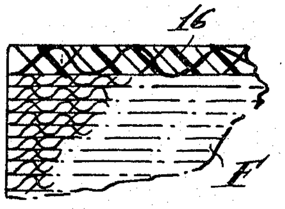
FIG. 7 is a diagrammatic, fragmentary vertical section, to larger scale than FIG. 1, showing one end of the lower member of the antifriction device and suggesting the employment of a vibration dampening material as the body portion of said member.

Referring to FIG. 7 of the drawings, the character F designates the body portion of a pad such as either of the pads 11 or 12, but which, for convenience in description, may be considered to be the pad 12. As illustrated, this body portion is of lamellar material, such as above suggested, but has permanently bonded to its upper face a ply 16 consisting of woven textile material impregnated with a cured thermoplastic having a low coefficient of friction and which provides a hard, smooth and glossy exposed surface. One example of a material suitable to form the ply 16 is a textile fabric impregnated with phenolic resin. This fabric is obtainable in a single uncured and flexible ply wherein the textile fabric is a cotton canvas weighing in excess of four ounces per square yard, and of low yarn count, for instance, having approximately 56 warp yarns and 24 double filling yarns per inch. This material is obtained in uncured condition and is placed upon the surface of the body fabric F, the latter having previously been fully vulcanized, and then the assembled parts are subjected to heat and pressure whereby the plastic in the ply 16 is completely cured or fused and becomes permanently bonded to the base material F. The plastic comprised in the ply or layer 16 is a thermosetting plastic—that comprised in the material above particularly referred to being a phenolic plastic. As noted on page 229 of Modern Plastics Encyclopedia for 1962, published by Modern Plastics, 770 Lexington Avenue, New York, New York:

"Important properties of general-purpose phenolic molding compounds are mechanical strength, dimensional stability in the presence of heat and moisture, corrosion resistance, surface smoothness and gloss, . . . and machineability."

From the above, it will be noted that phenolic resins have characteristics making them suitable for use in the device of the present invention, in particular, its surface smoothness and glass and its corrosion resistance.

In accordance with the present invention, the opposed faces of the pads 11 and 12 are of material such as the ply 16 of FIG. 7, as above described, and thus the opposed faces of the two pads are hard, smooth and glossy, and have a low coefficient of sliding friction relatively to each other. Moreover, because of the mechanical strength of the ply 16, its dimensional stability and corrosion resistance, a device 10 such as that of FIG. 1, forms an ideal antifriction element for use in such an environment as that illustrated in FIG. 6.

While the particular material above described, as forming the ply 16 of each of the pads 11 and 12, has been found useful, other materials having somewhat similar physical properties may be substituted therefor without substantial impairment of functional value. Thus, for example, such another material which may be employed is Synthane Sheet Grade C, which is described at page 400 of the "Handbook of Material Trade Names," by Zimmerman and Lavine, published by Industrial Research Service, Dover, New Hampshire, 1953 edition, as being:

"A uniformly dense, laminated, thermosetting plastic, made with various types if filler materials, such as cotton fabrics, . . . all impregnated with phenolic or melamine resins and then laminated under heat and pressure."

It is further described in said publication as characterized, among other things, by:

" . . . high tensile, compressive, flexural and impact strength."

and is characterized in having dimensional stability under temperature changes. It is further described as having a compressive strength of 37,000 pounds per square inch flatwise and a Rockwell hardness of 103.

Figures 2, 4, 5:
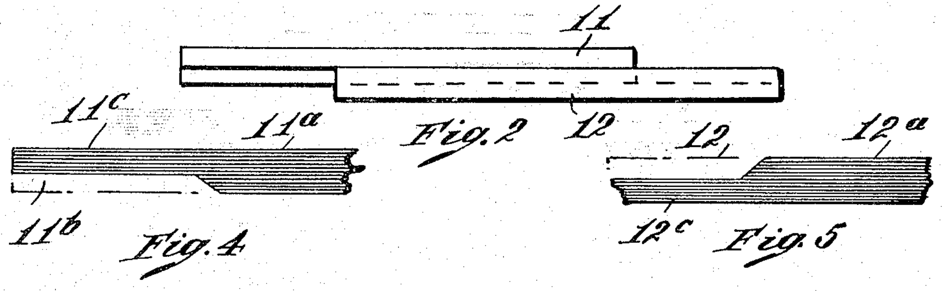
FIG. 2 is a side elevation of the device of FIG. 1, showing its constituent upper and lower members as having moved relatively from normal position.
FIG. 4 is a fragmentary end view of the top member of the device, illustrative of a preliminary step in the manufacture of the device.
FIG. 5 is a view, similar to FIG. 4, but showing the lower member of the device.
Figure 3:
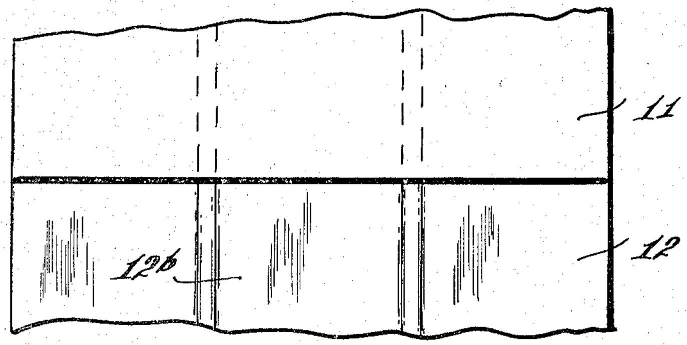
FIG. 3 is a fragmentary plan view of the device with its parts disposed in the relative position of FIG. 2.

While the antifriction device of the present invention may consist merely of two flat pads cimprised as above described, having their surface layers 16 in contact, it is desirable, in order to prevent edgewise creep of one pad relatively to the other, during a long period of use, to provide means for keeping them in proper sliding alignment. For this purpose, as illustrated in FIGS. 4 and 5, for example, the initially, uniformly thick base fabric of the upper pad 11, before assembly with the ply 16, is reduced in thickness at its opposite, lateral marginal portions by removal of material as indicated in broken lines at **11*b* (FIG. 3)—for example by peeling off plies of the material or by machining. The base fabric of the other ply, that is to say the ply 12, as here shown, is reduced in thickness at its midportion as indicated in broken lines at 12***c* (FIG. 5), so as to produce a longitudinally extending groove 12*b* (FIG. 3) in which the residual central portion or tongue 11*a* of the upper pad is received, thus providing in effect a tongue and groove relation between the upper and lower pads so that the upper may not move edgewise laterally relative to the lower pad while, at the same time, the part 11*a* of the upper pad 11 is free to slide longitudinally in the central groove 12*b* in the lower part. Obviously, if desired, the pads may be so shaped as to provide a plurality of parallel tongues and corresponding grooves.

After the base portions of the two pads have been shaped as above described, an uncured and flexible ply of the material which is to constitute the antifriction surface layer 16 is placed in registry with the shaped surface of the prepared base and the parts are subjected to high pressure between appropriately shaped, heated dies thereby curing the ply 16 while concomitantly shaping and bonding it to the base.

While, as here illustrated, the tongue member 11*a* is shown in the upper pad 11 and the groove which receives it in the lower member 12, it is obvious that this arrangement may be reversed, if desired, with the tongue in the lower member and the groove in the upper member.

Because of the characteristics of base fabric such as above suggested, for use in making the pads 11 and 12, accidental lateral motion of the pads relatively to the rigid parts which they contact is substantially impossible because of frictional resistance offered by the faces 13 and 14 of the pads. However, it is contemplated that, if desired, the surfaces 13 and 14 of the pads may be coated, before their installation between the parts B and P with an appropriate bonding material such as a plastic cement or the like, or with an abrasive coating so that, although the pads 11 and 12 easily move relatively to each other, they will not move relatively to the parts B and P respectively.

As respects a desirable thickness for the device 10, it is suggested that each of the two pads 11 and 12 be of a maximum thickness of approximately ¼ of an inch, so that the thickness of the combined structure, as shown in FIG. 1, would be slightly more than ½ inch—the thickness of each ply 16 desirably being of the order of 1/32 of an inch.

An alternative embodiment of the invention, preferable in certain situations, in particular, where unit loads are excessive; where the device is exposed to severe weather conditions or corrosive fumes; and/or where the opposed, relative-moving surfaces of the antifriction device are not exactly parallel, as may occur when the supported beam or girder is of long span or has a dead-load camber, is illustrated by way of example in FIGS. 8 to 13 inclusive. Thus, referring to FIG. 8, the numeral 20 designates an antifriction device, according to this preferred form of the invention, comprising the upper pad 21 and the lower pad 22—these pads corresponding in general to the pads 11 and 12 above described. Usually, as above described, each pad would be of generally rectangular shape in plan view and of the same superficial dimensions—the size of the pad being dependent upon the particular use and load which it is required to carry. Each of these pads comprises a body portion $F^1$, desirably having the same characteristics as the body portions F of the pads above described and of the structure diagrammatically illustrated in FIG. 12—having some degree of flexibility so that it may readily conform itself to slight irregularities of the surface of that one of the relatively movable parts (load and support, respectively) which it is intended to contact in use. Desirably that surface 30 (FIG. 12) of the body portion $F^1$ which is to contact the rigid member, with which it is to be associated, should be of a character such as to resist relative motion between said parts; for instance said surface may have a high coefficient of sliding friction or it may be inherently adhesive, or coated with adhesive before being placed in the position of use. As already described, a preferred construction for the body portion of the pad is that of material substantially as disclosed in the patent to Brennan, 2,009,059, dated July 23, 1935—the rubber layer or layers comprised in the material being so thin as substantially to eliminate any resiliency of the material in a direction normal to its layer thickness under variable compressive stresses applied in the direction of the depth or thickness of the layers, thus reducing lateral vibration, although the rubber acts to lessen any tendency of the fabric to become compressed and lifeless.

Figure 8:
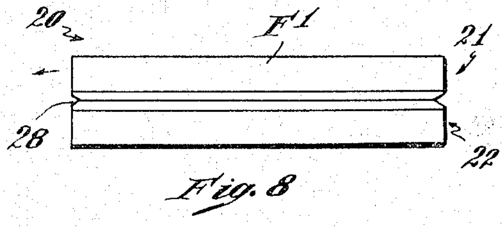
FIG. 8 is a side elevation, but showing a preferred embodiment of the invention.
Figure 10:
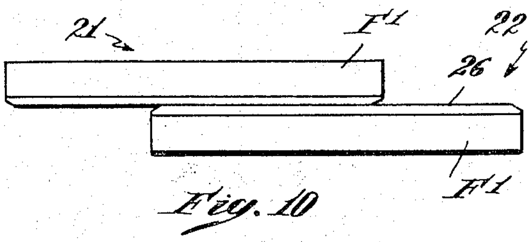
FIG. 10 is a side elevation of the device shown in FIG. 8, but showing its constituent upper and lower members as having moved, relatively, from normal position.
Figure 9:
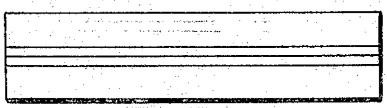
FIG. 9 is an end elevation of the device of FIG. 8.
Figure 11:
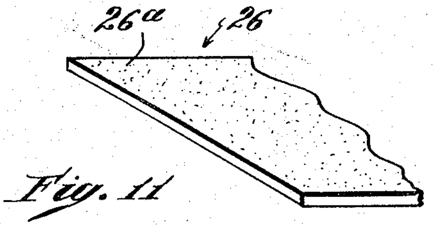
FIG. 11 is a diagrammatic perspective view illustrating a sheet of Teflon of a type which is particularly useful in the practice of the present invention.
Figure 12:
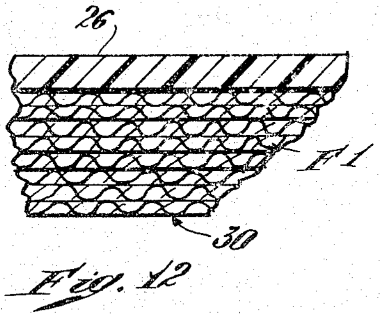
FIG. 12 is a diagrammatic, fragmentary vertical section, to much larger scale than FIG. 8, showing a portion of the lower member of the antifriction device in accordance with the preferred embodiment and suggesting the employment of a vibration dampening material as the body portion of said member.
Figure 13:
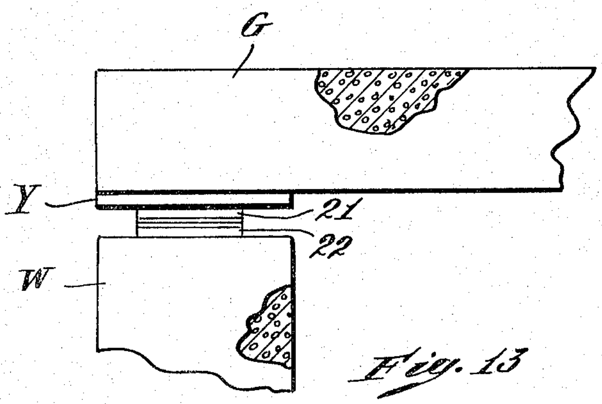
FIG. 13 is a fragmentary elevation diagrammatically showing the antifriction device of the present invention as interposed between one end of a concrete beam and the top of a masonry wall.

Referring to FIG. 13, where the antifriction device of FIG. 8 is shown as installed in position of use between one end of a concrete beam G and a rigid support, for example a masonry wall W, the lower member 22 of the device is shown as resting upon the upper horizontal surface of the wall W, while the upper surface of the pad 21 of the antifriction device is shown as contacting the horizontal undersurface of a bearing plate Y disposed beneath the movable end of the concrete beam G.

In accordance with this embodiment of the invention, there is bonded to one surface of the lamellar, cushioning body portion $F^1$, a sheet of Teflon (a tetrafluoroethylene polymer)—a synthetic thermoplastic plastic. Teflon is notable for its tensile strength and resistance to abrasion; high compressive strength and low vertical deflection under load; good heat stability and resistance to attack by most chemicals, including strong acids and organic solvents; an an extremely low coefficient of moisture-absorbence (0.01%) so that it is very resistant to weathering. It commercially available in sheets and films of pure Teflon (that is, without reinforcing elements), such sheets commonly being produced by extrusion. It is easily worked by woodworking or metalworking tools, and has a very low coefficient of sliding friction. The coefficient of friction for pure (non-reinforced) Teflon, sliding in contact with polished steel, is from approximately 0.035 at 725 p.s.i. to 0.030 at 2900 p.s.i.; it is substantially constant, under a given load through a temperature range almost up to its melting point; and is apparently the same for both static and dynamic stress; and the coefficient for Teflon sliding on Teflon appears to be of the same order as that of Teflon sliding on steel.

In assembling the Teflon sheet 26 with the body material F, those surfaces of the Teflon sheet and body material which are to be opposed to each other are coated with solvent-base elastomer adhesive of commercial type. Desirably, the surface of the body material is first scraped before applying the adhesive, which may be applied with a brush, and desirably the Teflon sheet has a surface specially prepared for bonding, which is accomplished by so-called "chemical etching," as indicated diagrammatically at 26*a* (FIG. 11), which removes fluorine atoms from the surface, leaving a film which adheres to industrial adhesives. Teflon sheeting, so etched, is a readily available article of commerce. Having coated the surfaces, which are to be opposed, they are placed in contact and subjected to slight pressure, without heat, merely to prevent them from moving relatively to each other while the solvent in the adhesive is evaporating.

Desirably, the upper and lower pads 21 and 22 are of the same thickness—the Teflon layer or ply being from 1/32 to 1/16 of an inch in thickness, while each of the pads may have a total nominal thickness of ¼, ½, ¾, 1, and so on up to 2 inches—for example depending upon the load which is to be supported. Preferably those edges of the respective pads which may overhang each other under extreme conditions of use are beveled or chamfered as illustrated at 28 to make an angle of approximately 30° with the horizontal, thereby to prevent the edge of one pad from scraping or planing the surface of the other during their relative movement. Desirably, the bevel should terminate at about half way between the faces of the Teflon layer.

If, as is usual, the Teflon sheet was prepared by extrusion, its opposite faces will exhibit parallel striations, and when assembling the pads, the opposed layers should be arranged so that the striations of the two layers are parallel, and in use, the striations should extend in the direction of motion of the movable, supported part.

In this combination the body portion $F^1$ of the pad provides for vertical cushioning while the readily slidable contacting faces of the Teflon sheets permit relative bodily movement of the two pads, as contrasted with the shear deformation of the pads heretofore suggested which consist solely of an elastomer-type of material. The body portion $F^1$ of the pad of the present invention absorbs shock and vibration disturbances and also compensates for angularity of the beam or girder—the result of which would be that the contacting faces of the Teflon plies would not be parallel and thus subjected to high concentrated non-uniform loading. Examples of the mode of calculating optimum dimensions of the antifriction pad of the present invention for various loadings follows.

Figure 14:
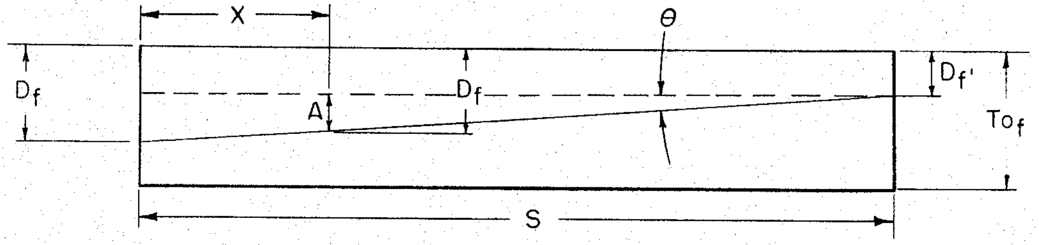
Figure 15:
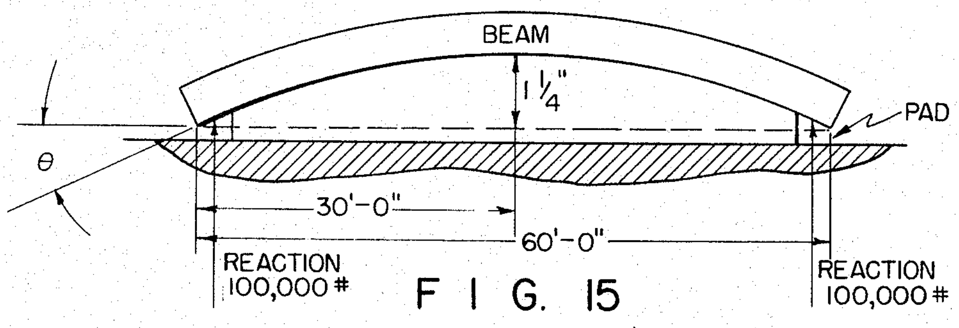

List of Symbols Employed $To_f$=Original thickness of pad
$\theta$=Bearing contact angle
$S$=Longitudinal dimension of pad
$D_f''$=Maximum deflection @ $x=o$
$D_f'$=Maximum deflection @ $x=s$
$D_f$=Deflection at any point @ $x=x$
$A=(D_f-D_f')$
$Y$=Uniform deflection value Equations Derived From the Trigonometry of Deflection Pattern (FIG. 14)

(1) $$\tan\theta=\frac{D_f''-D_f'}{S}=\frac{A}{s-x}$$

(2) $$D_f=D_f'+A$$

Solving Equation 1 for A:

(3) $$A=(s-x)\ (\tan\theta)$$

Substituting Equation 3 for A in Equation 2 yields:

*(4) $$D_f=D_f'+[(s-x)\ (\tan\theta)]$$

*For ease in determining deflection values ($D_f$) at incremental portions of "S," start at end $s=x$ ($D_f=D_f'$) and for each incremental (unit length) decrease in "S," add Tan $\theta$ value to $D_f'$.

CASE I (FIG. 15)

*Example*

Concrete Beam—Cambered Longitudinally

GIVEN: Beam rise at midsection—Beam end reactions.

For a 1¼" rise in 30 ft. (@ midspan), slope at beam end would be approximately 2" rise in 30 ft.

$$\therefore \tan\theta=\frac{2''}{(30')(12)}=0.0056$$

Total pad load=Reaction=100,000#
Assume beam width is 15" and pad length is 11" or less.
If beam ends are flat (not cambered) then the pad is stressed uniformly $$@\frac{100{,}000\#}{11''\times15''}=600\text{ p s.i.}$$

Figure 16:
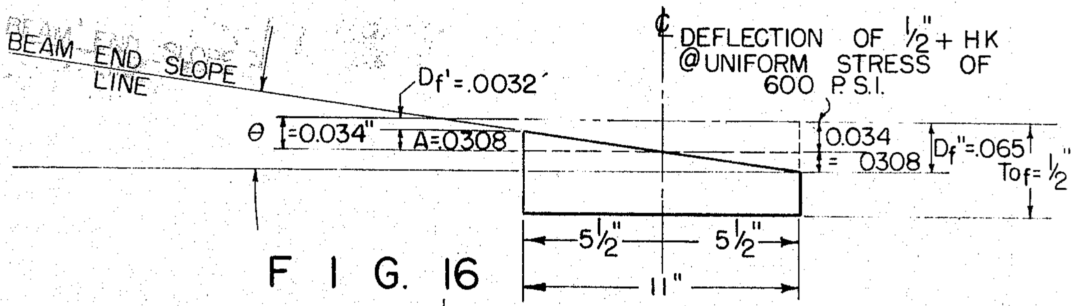

If beam is cambered then deflection pattern is altered. First consider a pad ½" thick (FIG. 16).

Tan $\theta$=0.0056
$A$=(5.5") (0.0056)
$A$=0.0308"

In non-cambered position uniform deflection is (0.034"). With beam cambered, uniform deflection is increased by amount (A) to give maximum deflection and decreased by amount (A) to yield minimum deflection as follows:

MAX. DEFL. $D_f''$=(0.0340)+(0.0308)=0.065"
MIN. DEFL. $D_f$=(0.0340)—(0.0308)=0.0032"

The respective stress values would be:

MAX. STRESS=1,750 p.s.i.
MIN. STRESS=27 p.s.i.

Stresses exceed allowable for cancrete, therefore, consider a 1" thick pad

@ 600 p.s.i.—uniform deflection=0.069"

$$A=0.0308$$

MAX. DEFL. $D_f''$=(0.069")+(0.0308")=0.0998
MIN. DEFL. $D_f'$=(0.069")—(0.0308")=0.0382"

Respective stress values would be:

*MAX. STRESS=1120 p.s.i.
MIN. STRESS=250 p.s.i.

* Note reduction in maximum stress value. Proceed until get desired maximum stress value.

CASE II

*Example*

GIVEN: Limit maximum stress in pad to allowable unit stress for concrete—700 p.s.i.

Utilizing the same bearing contact angle ($\theta$) and beam width as in Case I; namely:

Tan $\theta$=0.0056
Beam width=15"

Figure 17:
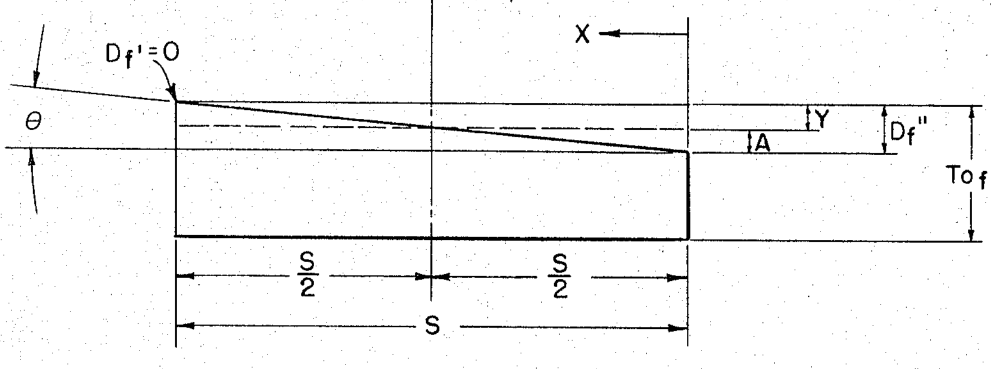

Assume that the desired minimum deflection $D_f'$=zero (FIG. 17). Consider ½" thickness of pad at stress of 700 p.s.i., ½" thick pad deflects 0.038".

(A) $$\therefore\ D_f''=0.038''$$

also (B) $$D_f''=(S)\ \tan\theta$$

Equating (A) and (B) and solving for S yields:

$$S=\frac{0.038''}{0.0056}=6.8''$$

Hence the pad (6.8" x 15" x ½" thick) under the above beam end camber would have a stress distribution of:

MAX. STRESS=700 p.s.i.
MIN. STRESS=0

Total reaction to beam would be determined as follows: For uncambered condition the uniform deflection value is (Y). Y must be a value such that when A is added to it, one obtains the maximum deflection $D_f$ and conversely when A is substracted one will get the minimum deflection $D_f'$.

From above sketch (FIG. 17), the following equations are readily obtained:

(C) $$A+Y=D_f''$$

(D) $$Y-A=D_f'$$

(E) $$A=(\tan\theta)\left(\frac{s}{2}\right)$$

Since $D_f'$=0, combine Equations D and E and solve for Y.

$$Y=\left[(\tan\theta)\left(\frac{s}{3}\right)\right]=0$$

$$Y=(\tan\theta)\left(\frac{s}{2}\right)$$

$$Y=(0.0056)\left(\frac{6.8}{2}\right)$$

$$Y=0.019''$$

∴@ uniform deflection of 0.019" and a ½" thick pad is stressed to 240 p.s.i.

Reaction=stress x pad area $$=240\frac{\#}{m^2}\times 102m^2$$

$$=24{,}480\text{ pounds}$$

For a beam loaded as indicated in FIG. 18, or one subjected to substantial rocking stress, as indicated in FIG. 19, the proper pad dimension may be similarly calculated.

Thus the device of the present invention provides a very simple, relatively cheap and extremely durable substitute for customary solid neoprene pads, as well as metallic bearings of bronze, lubricated with graphite heretofore employed and which necessitates the use of mechanical devices to take care of rotational motion and distribution of loads resulting from beam camber. The pad herein described will accommodate the longitudinal movement of the beam or girder because of the low frictional resistance at the meeting faces of the two Teflon plies with an almost insignificant reactive stress in the beam, while supporting and redistributing the vertical loads with limited deflection.

While herein certain dimensional relationships have been suggested as having been found useful for the intended purpose and while certain specific materials have been suggested as examples, it is to be understood that the invention is broadly inclusive of any and all equivalents which fall within the scope of the appended claims.

I claim:

Means for supporting one end of a girder whose length varies with temperature change, said means comprising, in combination, a rigid support having a substantially horizontal upper surface, and an unlubricated antifriction device comprising upper and lower pads, the lower of which rests upon said horizontal surface of the support and the upper of which is in load-carrying relation to the aforesaid end of a girder, each pad comprising a body portion and an antifriction contact ply of organic material, the contact plies of the two pads being opposed, the body portion of each pad being approximately ¼ of an inch in thickness and of lamellar construction comprising a plurality of thin layers of inelastic organic material which are substantially non-extensible under load, and layers of elastomeric material intercalated between certain of said first-named layers, the layers of elastomeric material being so thin as substantially to eliminate resiliency of the pad in response to vertically directed forces but being operative to lessen tendency of the pad to become compacted and lifeless, the antifriction layer of each pad consisting of synthetic resin, said antifriction layer having a hard, smooth, glossy surface and a coefficient of friction less than that of polished steel-on-steel and being of high impact resistance—the antifriction layers sliding relatively to each other without tendency to seize or bind in response to variations in a length of the girder, and the opposed faces of the pads being of a shape such as to provide a tongue and groove couple operative to permit the pads to slide freely parallel to the length of the tongue and groove but preventing relative motion of the pads in other directions.

References Cited by the Examiner

UNITED STATES PATENTS

| | | | |
|---|---|---|---|
| Re. 24,765 | 1/1960 | White | 308—238 X |
| 1,845,858 | 2/1932 | Watson | 308—238 X |
| 2,009,059 | 7/1935 | Brennan | 267—63 |
| 2,029,366 | 2/1936 | Geyer | 308—238 X |
| 2,251,126 | 7/1941 | Gatke | 308—238 X |
| 2,253,255 | 8/1941 | Weber | 267—47 X |
| 2,639,248 | 5/1953 | Overholt. | |
| 2,642,370 | 6/1953 | Parsons. | |
| 2,815,252 | 12/1957 | Baker | 308—238 X |
| 2,906,569 | 9/1959 | Runton | 308—238 X |
| 2,953,418 | 9/1960 | Runton | 308—238 |
| 2,983,563 | 5/1961 | Runton | 308—238 |
| 2,991,808 | 7/1961 | Siegman | 138—141 |
| 3,000,276 | 9/1961 | Foulger | 94—10 |
| 3,031,202 | 4/1962 | Melton | 308—238 X |
| 3,037,893 | 6/1962 | White. | |
| 3,082,485 | 3/1963 | Thomas | 18—59 |
| 3,105,252 | 10/1963 | Milk | 14—16 |
| 3,126,209 | 3/1964 | Jewell | 308—3 X |
| 3,167,308 | 1/1965 | Bernstein | 308—238 X |
| 3,243,236 | 3/1966 | Graham | 308—238 X |

FOREIGN PATENTS

| | | |
|---|---|---|
| 552,456 | 11/1956 | Belgium. |

MARTIN P. SCHWADRON, *Primary Examiner.*

DAVID J. WILLIAMOWSKY, *Examiner.*

L. L. JOHNSON, *Assistant Examiner.*